United States Patent [19]

Jamain

[11] 4,222,423
[45] Sep. 16, 1980

[54] PNEUMATIC TIRE TREAD

[75] Inventor: Philippe Jamain, Chatel-Guyon, France

[73] Assignee: Compagnie Generale des Etablissements Michelin, Clermont-Ferrand, France

[21] Appl. No.: 967,597

[22] Filed: Dec. 8, 1978

[30] Foreign Application Priority Data

Dec. 16, 1977 [FR] France .............................. 77 38560

[51] Int. Cl.$^2$ ............................................ R60C 11/08
[52] U.S. Cl. ............................................... 152/209 R
[58] Field of Search ........... 152/209 R, 209 D, 209 B, 152/209 A, 324, 325; D12/146, 150, 149, 151, 142, 145, 147

[56] References Cited

U.S. PATENT DOCUMENTS

| D. 190,985 | 7/1961 | Blankenship et al. | 152/209 D |
| 2,079,091 | 5/1937 | Walsh | 152/209 R |
| 3,674,077 | 7/1972 | Verdier | 152/209 R |
| 3,799,231 | 3/1974 | Boileau | 152/209 R |

Primary Examiner—Michael W. Ball
Attorney, Agent, or Firm—Brumbaugh, Graves, Donohue & Raymond

[57] ABSTRACT

Pneumatic tire comprising a tread having rows of elements in relief presenting ridges of substantially transverse orientation with a broken line trace and incisions is improved due to the fact that at least most of the segments of the substantially transverse ridges have an inclination which increases progressively, with respect to the transverse direction, from the center line of the tread towards each of the edges thereof.

4 Claims, 2 Drawing Figures

PNEUMATIC TIRE TREAD

The present invention relates to improvements in pneumatic tires and more particularly to tires intended to travel on snow covered roads. It is directed at obtaining for this type of tire, assuring under different operating conditions, good compromise between opposing requirements such as good adherence upon starting and braking, uniform and reduced wear, transverse road holding, and removal of the water between the road and the tire.

It is already known to provide tires, and particularly those intended to travel on snow and ice, with a tread which has rows of elements in relief or blocks of varied shape which succeed one another or are interlaced in each other both in the circumferential direction and in the transverse direction. Furthermore, in the case of tires intended to travel on snow and ice, certain relief elements can be provided with studs housed in recesses especially provided to receive them, so as to reduce skidding on ice.

These tires, although universally used, have low adherence, namely an adherence which is insufficient in case of strong torques both upon starting and braking, and their transverse stability (road holding) is insufficient.

When maximum adherence is obtained, the wear of the tread is rapid and nonuniform and the tire is very noisy in operation. When maximum transverse stability is obtained, it becomes difficult to expel the water in the area of contact between the tire and the road.

The invention is directed at overcoming these drawbacks and in providing an arrangement of elements in relief which effectively combines the different desired characteristics.

The pneumatic tire in accordance with the invention comprising a tread having rows of elements in relief presenting ridges of substantially transverse orientation with a broken line trace and incisions is characterized by the fact that at least most of the segments of the substantially transverse ridges have an inclination which increases progressively, with respect to the transverse direction, from the center line of the tread towards each of the edges thereof.

Thus, instead of the inclination of the substantially transverse ridges of the elements in relief being constant with respect to the transverse direction from one edge of the tread to the other, as is true in the relief elements known in the prior art, the segments of the substantially transverse ridges with a broken line trace have an orientation which is more transverse at the center line of the tread, with an inclination which increases progressively from the center line of the tread towards the edges thereof.

As results from the definition given above, this arrangement makes it possible for the tread to transmit the drive forces and the braking forces in greatly improved fashion, that is to say to have good adherence.

This arrangement furthermore makes it possible, on the one hand, to have a transverse road holding of the tire which is substantially improved due to the fact that the elements in relief have a more substantially longitudinal orientation at the shoulders of the tire and, on the other hand, to expel and evacuate the water transversely in case of travel on a wet road or on melting snow.

The inclination of the substantially transverse ridges is between 0° and 60°, and preferably between 20° and 45°, with respect to the transverse direction.

In accordance with a first variant, the elements in relief have incisions with a broken line trace, each segment of which has, like the ridges of the elements in relief, an inclination which increases progressively, with respect to the transverse direction, from the center line of the tread towards each of the edges thereof. There results from this a reinforcing of the effects obtained by the progressively increasing inclination of the ridges of the elements in relief. The segments of the incisions adjacent to the center line of the tread have an inclination of between 0° and 20° with respect to the transverse direction.

In accordance with another variant, the elements in relief are separated from each other transversely by grooves having a broken line trace, one segment of which grooves has an inclination of between 0° and 20° with respect to the transverse direction.

Finally, the inclinations of the segments of the ridges and of the incisions from the center line of the tread to the edges thereof may be symmetrical or unsymmetrical with respect to the center line of the tread.

The invention will be better understood from a reading of the description of embodiments, given by way of illustration and not of limitation, with reference to the accompanying drawing in which.

Figure 1:
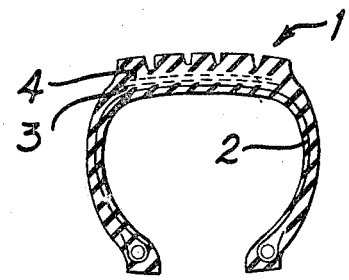
FIG. 1 is a schematic sectional view through a pneumatic tire.

FIG. 1 shows the tread 1 of a tire comprising a carcass reinforcement 2 formed of radially arranged cords and a tread reinforcement formed of two superimposed plies 3 and 4 of metal wires or cables which are parallel to each other in each ply and crossed from one ply to the other, the angles thus formed with the circumferential direction being between about 15° and 30°.

Figure 2:
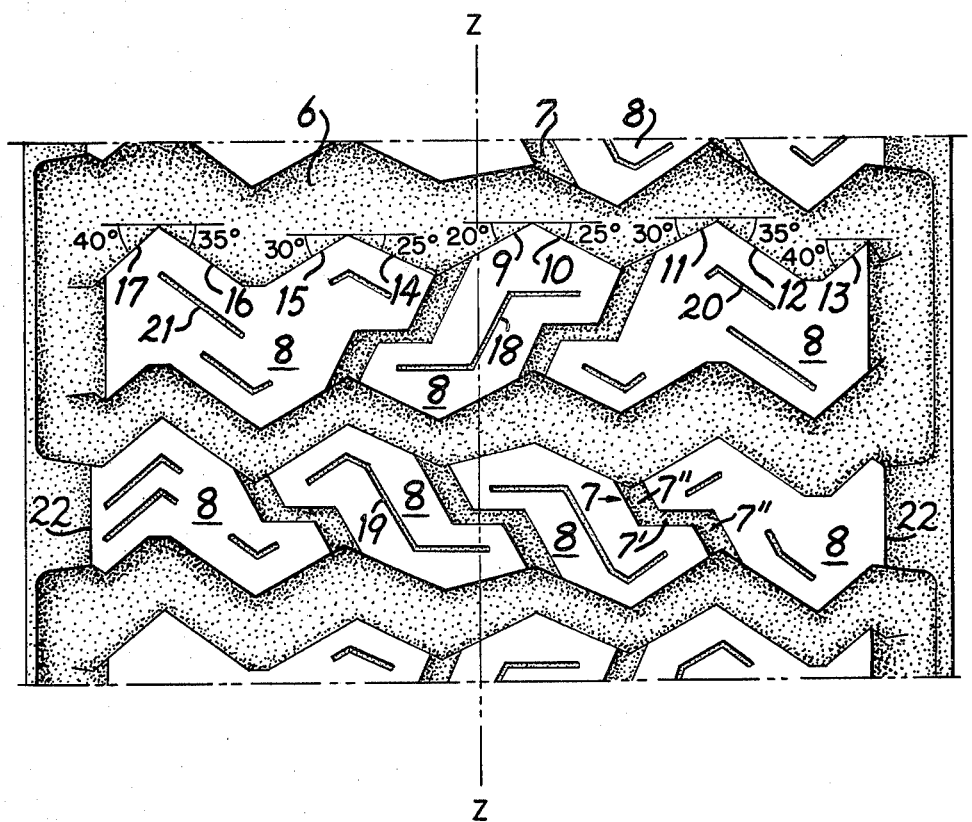
FIG. 2 is a plan view of a tire tread in accordance with one particular embodiment of the invention.

FIG. 2 shows that the tread 1 is sculptured primarily by means of transverse grooves 6 having a broken line trace and connected with each other by narrow grooves 7, the broken line trace of which comprises a segment 7' and two segments 7''. These grooves 6 and 7 define elements in relief 8, the ridges 9–17 of which have a broken line trace; each ridge 9, 10, 11, 12, 13, on the one hand, and 9, 14, 15, 16, 17, on the other hand, has an inclination, with respect to the transverse direction, whose amplitude increases progressively from the center line ZZ of the tread 1 up to the edges 22 thereof. Thus, the ridge 9 forms an angle of 20° with respect to the transverse direction (perpendicular to the center line ZZ), the ridge 10 an angle of 25°, the ridge 11 an angle of 30°, the ridge 12 an angle of 35° and the ridge 13 an angle of 40°. Likewise, the ridge 14 forms an angle of 25°, the ridge 15 an angle of 30°, the ridge 16 an angle of 35°, and the ridge 17 an angle of 40°.

The narrow grooves 7 have a segment 7' of transverse direction while the two segments 7'' have a substantially longitudinal direction.

The elements in relief 8 comprise incisions 18, 19, 20 having a broken line trace and the incision 21 having a linear trace. The incisions 18, 19 which are close to the center line ZZ have at least one substantially transverse segment, while the incisions further away from said center line, such as 20 and 21, do not have any segment of transverse orientation, but rather segments which have a trace which is substantially parallel to that of the inclined ridges of the elements in relief 8 in which they are located.

In the arrangement of the elements in relief which has been described above by way of example, it is of course possible to eliminate certain incisions or to replace them by recesses intended to receive studs in order to improve the adherence of the tread to ice or on iced snow. Furthermore, the inclinations of the segments may be symmetrical or not with respect to the center line of the tread.

What is claimed is:

1. A pneumatic tire for use on snow covered roads, comprising a radial carcass reinforcement, a tread reinforcement comprising at least two superimposed crossed plies of wires or cables parallel to each other in each ply, a tread having substantially transverse rows of blocks which are interlaced and the substantially transverse ridges of which have a broken line trace, characterized by the fact that at least most of the segments of the substantially transverse ridges have an inclination which increases progressively, with respect to the transverse direction, from the center line of the tread towards each of the edges thereof.

2. The pneumatic tire according to claim 1, characterized by the fact that the inclination of the substantially transverse ridges is between 0° and 60° with respect to the transverse direction.

3. The pneumatic tire according to claim 2, characterized by the fact that the inclination of the substantially transverse ridges is between 20° and 45° with respect to the transverse direction.

4. The pneumatic tire according to claim 2, characterized by the fact that the blocks are separated from each other transversely by grooves having a broken line trace, one segment of these grooves having an inclination of between 0° and 20° with respect to the transverse direction.

* * * * *